Jan. 14, 1936.  J. S. TULLY  2,027,499
FLEXIBLE COUPLING
Filed Oct. 15, 1934

INVENTOR
J. S. Tully
BY
ATTORNEY

Patented Jan. 14, 1936

2,027,499

UNITED STATES PATENT OFFICE 2,027,499

FLEXIBLE COUPLING

John S. Tully, Modesto, Calif.

Application October 15, 1934, Serial No. 748,332

1 Claim. (Cl. 280—33.44)

This invention relates to flexible or swivel couplings and particularly to one designed for use between a motor vehicle and trailer or between a tractor and an implement and the like.

The principal objects of my invention are to provide a coupling for the purpose which is extremely compact so that it takes up but little space between the vehicles to which it is connected; one which allows the trailer or implement tongue to have the necessary universal movement relative to the draft vehicle; and one which is very simple and inexpensive and yet has desirable sturdy and long wearing qualities.

These objects I accomplish by means of such structure and relative arrangement of parts as will fully appear by a perusal of the following specification and claim.

In the drawing similar characters of reference indicate corresponding parts in the several views.

Figure 1:
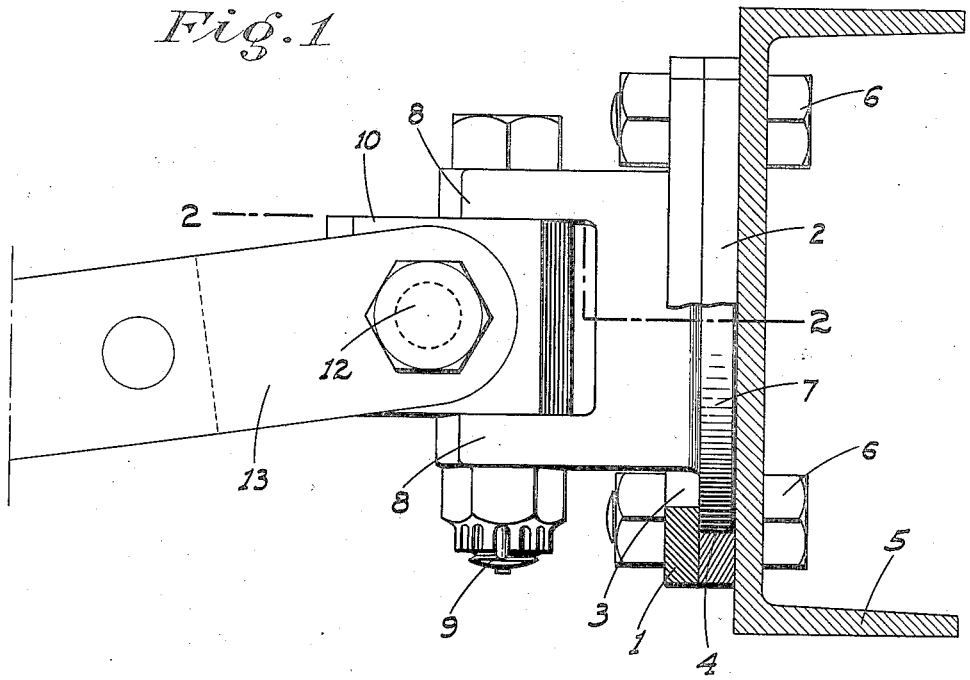
Figure 1 is a side elevation of my improved coupling partly broken out, shown as applied to a motor truck.
Figure 2:
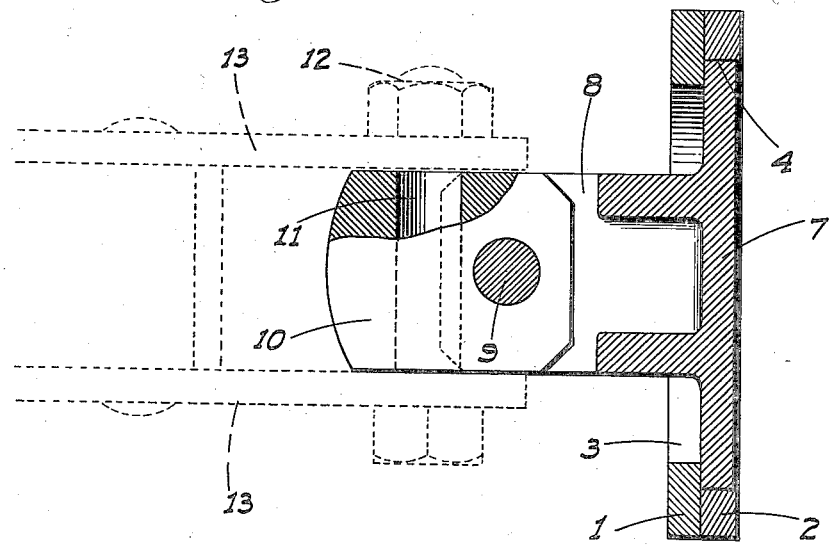
Figure 2 is a sectional plan of the device on the line 2—2 of Figure 1.

Referring now more particularly to the characters of reference on the drawing, the coupling comprises a pair of abutting plates 1 and 2 of the same size and preferably square. The plate 1 is provided with a circular centrally located opening 3 of relatively large size while the plate 2 is provided with a concentric but somewhat larger opening 4. The plates are adapted to be disposed in a vertical position against the back cross frame 5 or similar member of a truck or other motor or draft vehicle, and to be secured to each other and to said frame by bolts 6 passing through the plates adjacent its corners or outwardly of the openings.

The opening 4 serves as a bearing for the swivel disc 7 or turntable of the coupling unit. This disc cannot move rearwardly owing to the shoulder formed in the plate 1 about the relatively small opening 3, nor can it move forwardly owing to the backing provided by the frame 5. The turntable disc is slightly thinner than the plate 2 so that it will not be clamped against the frame 5 in connection with the plates and which would prevent its freedom of rotation.

Projecting rearwardly from the turntable 7 equal distances on opposite sides of the central axis thereof and in clearance relation to the side wall of the opening 3 are spaced parallel ears 8. These ears support a king pin 9 which is disposed with its axis at right angles to the axis of the turntable and which also turnably pass through a block 10 projecting between and extending a short distance rearwardly of the ears, and freely turnable about said pin as an axis.

The block rearwardly of the pin 9 is formed with a bore 11 extending at right angles to the pin 10. This bore receives another pin or bolt 12 which projects through the side plates 13 or clevice of the trailer or implement tongue and which straddle the block with just sufficient play to enable them to turn about the bolt 12 as an axis without binding.

It will therefore be seen that regardless of whether the turntable turns so that the ears are vertical or laterally spaced, and whether the bolt 12 is horizontally or vertically disposed, the trailer tongue can swivel about the bolt 12 and the pin 9 in corresponding planes; while the coupling unit as a whole can swivel about the fixed plates and the frame of the vehicle. Misalinement of the vehicles due to road or ground inequalities, as well as when rounding curves, are therefore taken care of in an efficient manner and without possibility of binding. Also, due to the compact arrangement of the parts of the coupling, all said parts are relatively small and short so that the coupling as a whole takes up very little room and it may readily be made to have the necessary sturdiness to stand rough treatment without being unduly heavy.

When merchandising the structure prior to its being applied to the vehicles, the bolts 6 are used to hold the plates 1 and 2 together. Since the pin 9 which is also in place is longer than the diameter of the opening 3 the plates obviously cannot be completely disassociated from the coupling unit and there is no danger of them becoming lost or misplaced.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described my invention what I claim as new and useful and desire to secure by Letters Patent is:

A flexible coupling for a motor vehicle having a frame and a trailer having a tongue and clevice comprising a disc adapted to rotatably engage with its forward face against a flat vertical portion of the vehicle frame, spaced ears formed integral with and projecting rearwardly from the other face of the disc, a block turnably mounted between the ears for rotation about an axis at right angles to the rotational axis of the disc, a bolt through the block rearwardly of the pivotal mounting thereof and at right angles thereto for turnable engagement with the trailer clevis and a mounting plate unit for the disc, said unit comprising a plate of slightly greater thickness than the disc and having a circular bore forming a bearing for the plate, a flange projecting from the plate over the outer edge of the rear face of the disc and means securing said mounting plate unit to the said vehicle frame.

JOHN S. TULLY.